W. C. PINSON.
INSECT DESTROYER.
APPLICATION FILED OCT. 9, 1911.

1,024,698.

Patented Apr. 30, 1912.

4 SHEETS—SHEET 1.

Witnesses

W. C. Pinson, Inventor by _____, Attorneys

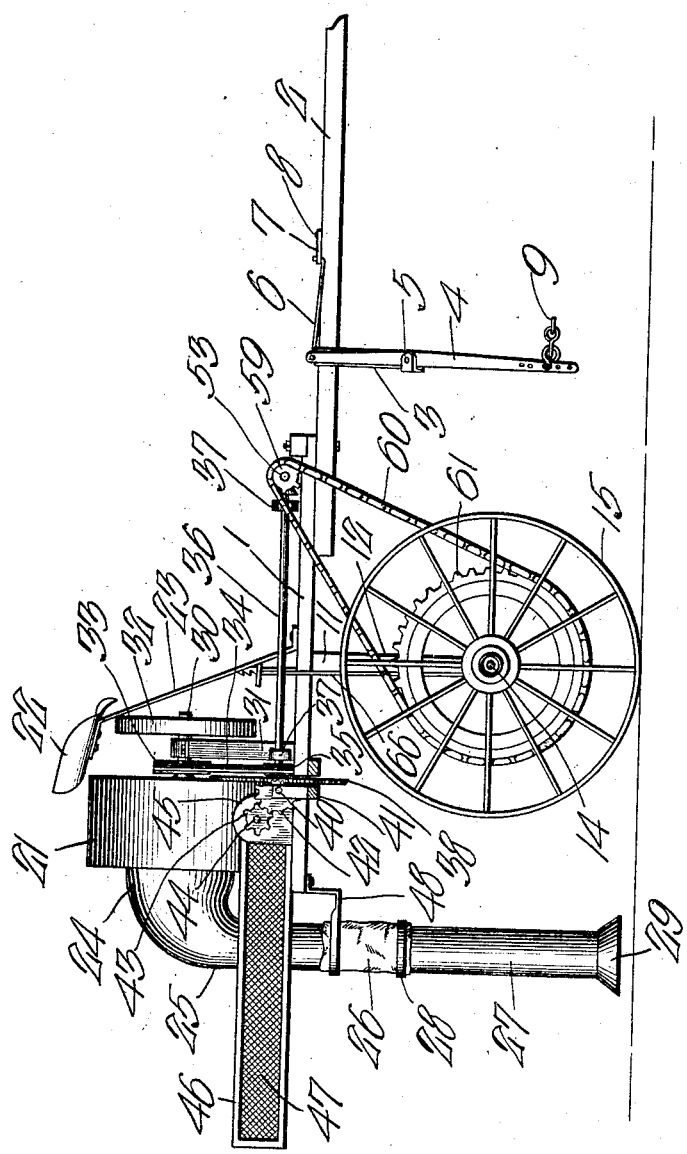

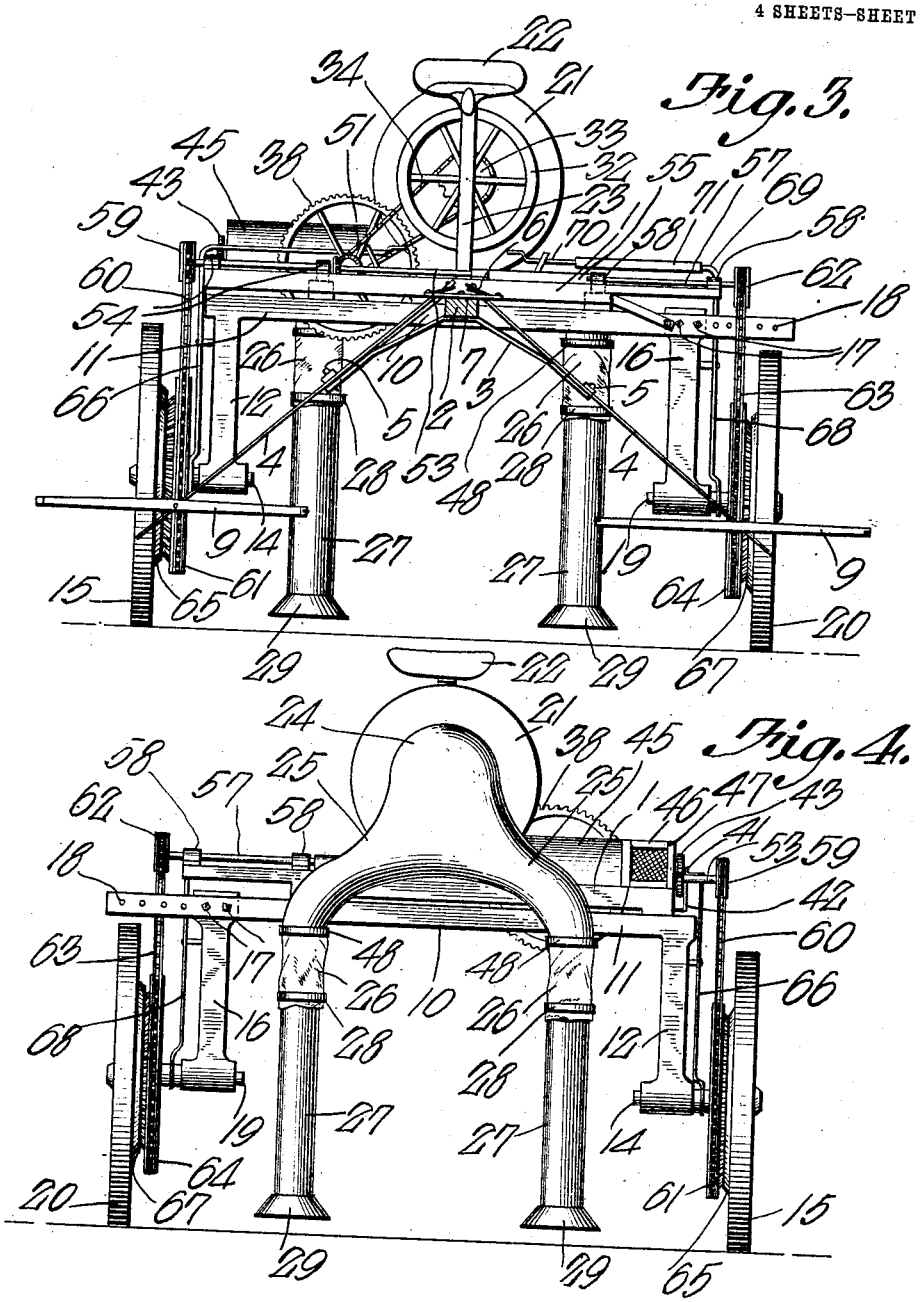

W. C. PINSON.
INSECT DESTROYER.
APPLICATION FILED OCT. 9, 1911.

1,024,698.

Patented Apr. 30, 1912.
4 SHEETS—SHEET 4.

Witnesses

W. C. Pinson  Inventor
by C. A. Snow & Co.
Attorneys.

UNITED STATES PATENT OFFICE.

WILLIAM C. PINSON, OF HERMITAGE, ARKANSAS.

INSECT-DESTROYER.

1,024,698.    Specification of Letters Patent.    Patented Apr. 30, 1912.

Application filed October 9, 1911. Serial No. 653,654.

*To all whom it may concern:*

Be it known that I, WILLIAM C. PINSON, a citizen of the United States, residing at Hermitage, in the county of Bradley and State of Arkansas, have invented a new and useful Insect-Destroyer, of which the following is a specification.

The device forming the subject-matter of this application, is adapted, primarily, although not exclusively, to be employed for collecting and destroying boll weevils, and for collecting the punctured squares in a cotton field. The weevils and the punctured squares are collected by and discharged from the blower, the gathered up material passing from the blower through the discharge tube in which the material is finely divided by the coöperation of fixed and rotating knives, the material passing from the discharge tube into a collecting receptacle.

The invention aims to provide a novel means for knocking the insects and the punctured squares to the ground; to provide novel means for destroying the insects and the punctured squares; to provide novel mechanism for driving the suction means and the destroying means above referred to; and to provide a carrying frame which may be expanded, so as to straddle rows which are spaced at different distances apart.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

Figure 1:
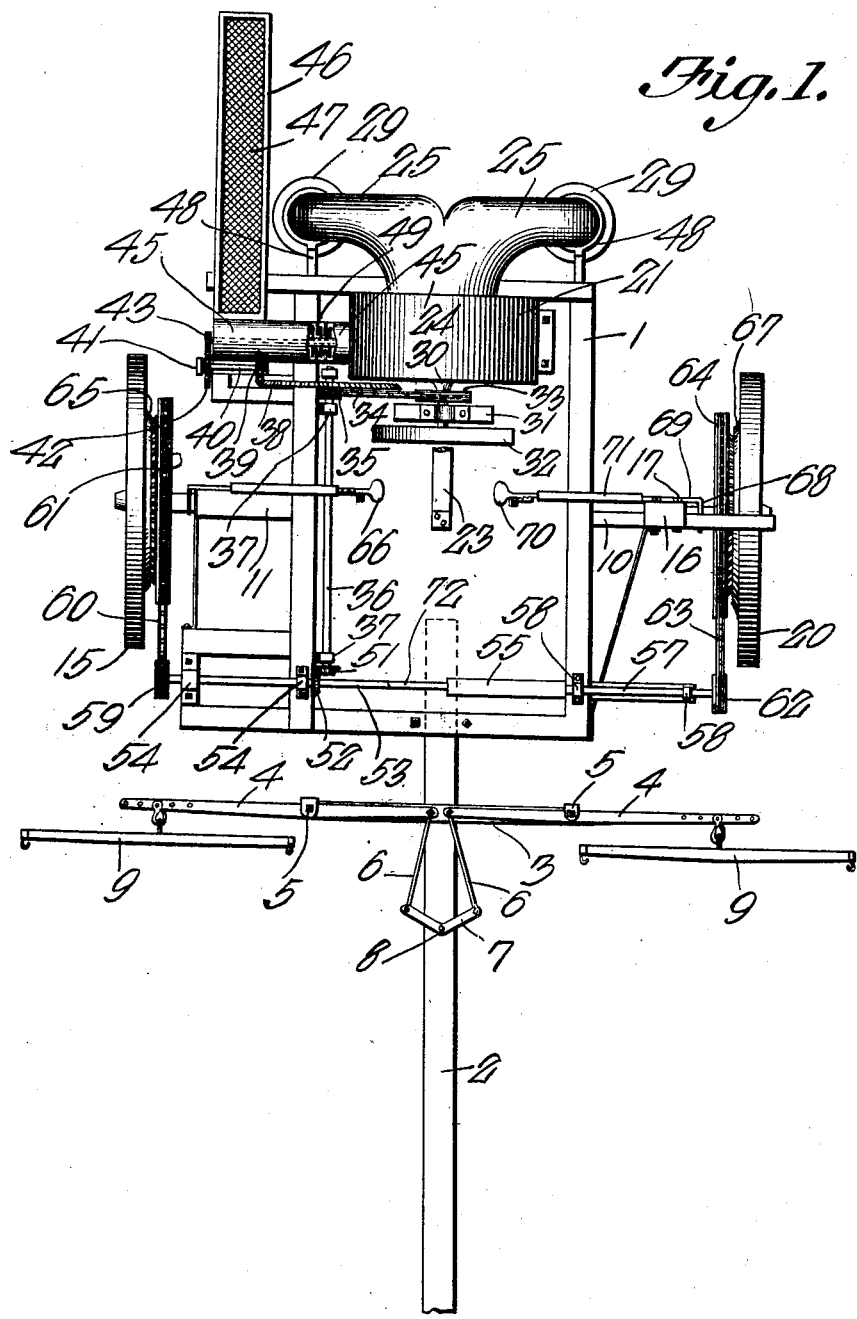
Figure 6:
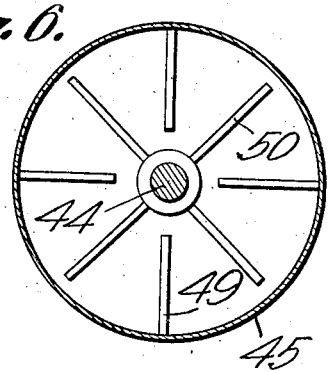
Figure 5:
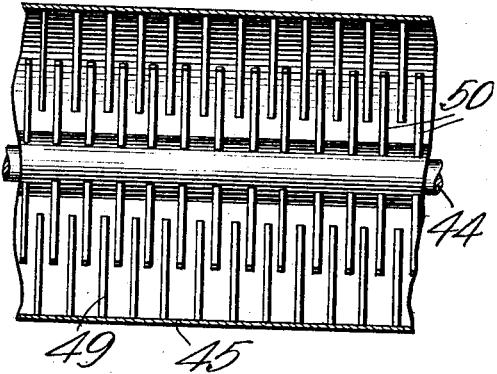
Figure 7:
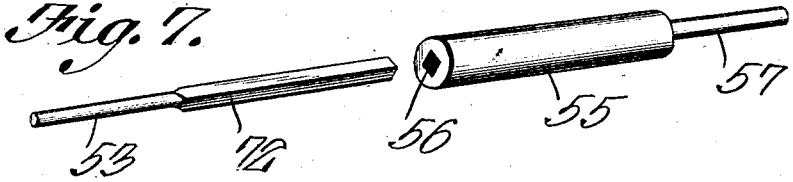
Figure 8:
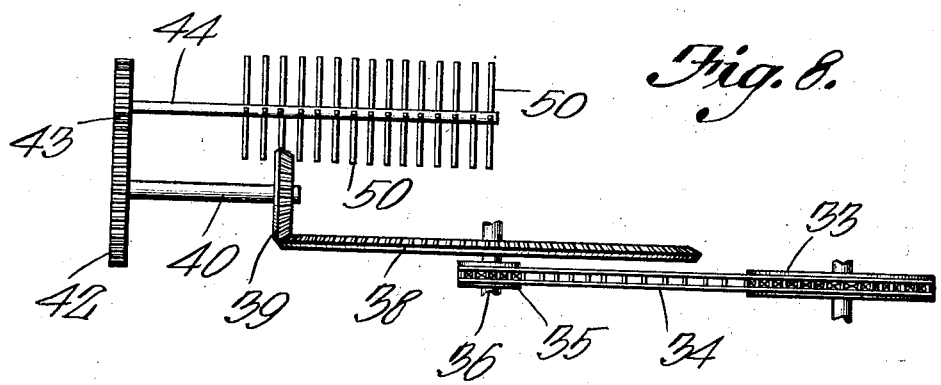

In the accompanying drawings,—Figure 1 shows the invention in top plan; Fig. 2 is a side elevation; Fig. 3 is a front elevation, parts being sectioned, and sundry details being omitted, for the sake of clearness; Fig. 4 is a rear elevation; Fig. 5 is a fragmental longitudinal section of the discharge tube and the mechanism contained therein whereby a destruction of the insects and of the punctured squares is effected; Fig. 6 is a transverse section of the discharge tube and its attendant mechanism; Fig. 7 is a perspective showing the slip parts of the drive shaft; and Fig. 8 is a perspective showing the mechanism whereby that portion of the device appearing in Figs. 5 and 6, is actuated.

In carrying out the invention there is provided a supporting frame 1, equipped at its forward end with a tongue 2. Secured to the tongue 2 is a transverse head 3, the extremities of which slope downwardly, in opposite directions.

The numeral 4 indicates levers which are fulcrumed intermediate their ends, as shown at 5, upon the outer ends of the head 3. To the inner ends of the levers 4 are pivoted forwardly extended links 6, connected with the outer ends of an equalizing lever 7, fulcrumed intermediate its ends, as shown at 8, upon the tongue 2. Loosely united with the outer ends of the levers 4, are the swingle trees 9.

The foregoing construction presupposes that the structure is to be drawn by draft animals, but obviously, any other means of propulsion may be employed.

The invention further includes a longitudinally extensible axle, denoted generally by the numeral 10. The axle 10 includes a bar 11, secured to the frame 1, transversely of the same, the bar 11 being provided at one end with a rigid, depending hanger 12, carrying a stub shaft 14, equipped with a ground wheel 15. The bar 11 carries likewise, a slidable, depending hanger 16, secured to the bar 10 by means of bolts 17 or the like, the bolts 17 being adapted to register successively in openings 18 in the bar 10. The slidable hanger 16 carries a stub shaft 19, equipped with a ground wheel 20.

Mounted upon the frame 1, adjacent the rear of the vehicle, is a suction and discharge fan, indicated generally at 21, the fan 21 being located, preferably, to the rear of the seat 22, carried by a standard 23, secured to the frame 1. The suction and discharge mechanism 21 preferably extends transversely of the vehicle, and communicates with a rearwardly extended suction pipe 24, having depending, diverging branches 25, supported by brackets 48, secured to the frame 1. The brackets 48 may be employed for binding upon the branches 25, the flexible tubes 26, into which the upper ends of the ground pipes 27 are inserted, clamping rings 28 holding the members 27 and 26 together, adjustably, so that the pipes 27 may be elevated and lowered, the flexible tubes 26 serving to permit the pipes 27 to swing about, when an obstacle is encountered. The lower ends of the ground pipes 27 are flared, as shown at 29.

The shaft of the suction and discharge fan is denoted by the numeral 30, the forward end of the shaft 30 being received in a bearing 31 supported by the frame 1. The bearing 31 appears clearly in Figs. 1 and 2, but, for the sake of clearness, is omitted from the showing of Fig. 3. Secured to the forward end of the shaft 30 is a fly wheel 32, and a sprocket wheel 33 is secured to the shaft 30, between the bearing 31 and the suction and discharge mechanism 21.

About the sprocket wheel 33 is trained a sprocket chain 34, the sprocket chain 34 engaging a sprocket wheel 35 carried by an auxiliary shaft 36, extended longitudinally of the vehicle and supported for rotation in frame-carried bearings 37.

Secured to the rear end of the auxiliary shaft 36 is a beveled pinion 38, meshing into a beveled pinion 39, secured to a shaft 40, extended transversely of the vehicle and journaled for rotation in frame-supported bearings 41. The outer end of the shaft 40 carries a pinion 42, meshing into a pinion 43, carried by a shaft 44, extended transversely of the vehicle, and journaled for rotation within a discharge tube 45. The inner end of the discharge tube 45 communicates with the casing of the fan mechanism 21, the outer end of the discharge tube communicating with a collection receptacle 46, extended longitudinally of the vehicle and supported upon the frame 1. The collection receptacle 46 is constructed partially of wire netting or the like, as shown at 47, so that there may be no back pressure against the suction and discharge mechanism 21.

Referring to Fig. 1 and comparing the same with Figs. 5 and 6, it will be seen that the discharge tube 45 carries a plurality of inwardly projecting, radially disposed knives 49, the shaft 44 carrying a series of radially disposed knives 50, adapted to move between the fixed knives 49.

Secured to the forward end of the auxiliary shaft 36 is a beveled pinion 51, meshing into a beveled pinion 52, carried by a shaft 53, extended transversely of the vehicle, and journaled for rotation in frame-supported bearings 54. The inner end of the shaft 53 is squared, as shown at 72, to fit against rotation, but slidably, in a sleeve 55, the bore 56 of which corresponds in cross section to the cross section of the end 72 of the shaft 53. The sleeve 55 is carried by a shaft 57, journaled for rotation in bearings 58 supported by the frame 1.

The outer end of the shaft 53 carries a sprocket wheel 59, about which is arranged a sprocket chain 60, carried over a sprocket wheel 61, carried by the stub shaft 14. The outer end of the shaft 57 carries a sprocket wheel 62, about which is trained a sprocket chain 63, engaged by a sprocket wheel 64, carried by the stub shaft 19.

A clutch 65 serves to connect the sprocket wheel 61 operatively with the ground wheel 15. The clutch 65 is controlled by a frame supported lever 66, carried upwardly upon top of the frame, within easy reach from the driver's seat 22.

A clutch 67 operatively connects the sprocket wheel 64 with the ground wheel 20, the clutch 67 being controlled by a frame-supported lever 68, the end 69 of which extends upwardly across the top of the frame 1. The end 69 of the clutch lever 68 is connected with a foot portion 70 of the clutch lever, by means of a sleeve 71, a slidable connection being thus provided between the elements 69 and 71, so that the clutch lever may be elongated, when the movable hanger 60 is slid upon the axle bar 11.

The practical operation of the device is as follows: When the vehicle is pulled by draft animals, the trees 9 and the levers 4 will be under constant motion. The levers 4 extend downwardly, in front of the pipes 27, and the draft rigging will sweep a wide area, in front of the machine, the levers 4 and the trees 9 coöperating to shake the plants and to cause the weevils and the punctured squares to drop to the ground. When the vehicle is drawn forwardly, presupposing that the clutches 65 and 67 connect the ground wheels 15 and 20 respectively with the sprocket wheels 61 and 64, the sprocket chain 60 will actuate the shaft 53, and the sprocket chain 63 will actuate the shaft 57, the shafts 57 and 53 being operatively connected by means of the sleeve 55. The drive upon the shaft 53 will thus be distributed equally between the ground wheels 15 and 20. When the shaft 53 is thus rotated, the intermeshing beveled pinions 52 and 51 will cause a rotation of the auxiliary shaft 36, the sprocket wheel 35 actuating the drive chain 34, and the chain 34, through the medium of the sprocket wheel 33, causing a rotation of the shaft 30, the suction and discharge mechanism being thereby put into operation. A strong upward draft will be created through the pipes 27, whereby the insects and the punctured squares will be drawn through the mechanism 21, and be forced therefrom into the discharge tube 45, and from the discharge tube 45 into the collection receptacle 46. When the auxiliary shaft 36 is rotated in the manner hereinbefore described, the intermeshing beveled pinions 38 and 39 will cause a rotation of the shaft 40, the intermeshing pinions 42 and 43 causing a rotation of the shaft 44, the shaft 44 actuating the knives 50. The coöperating knives 50 and 49 will serve to divide finely the punctured squares, and to kill the weevils, while the same are passing through the discharge tube 45. When it is desired to separate the ground wheels 15 and 20, in order that the ground wheels may pass properly between the rows, the bolts 17 are removed, and the movable hanger 16 is slid to an adjusted position upon the bar 11. The sleeve 55 will permit a corresponding elongation of the drive shaft, and the sleeve 71 will permit an elongation of the clutch lever at one side of the machine.

It will be understood readily that by manipulating the clutch levers 66 and 70, the ground wheels 15 and 20 may be disposed out of driving relation with respect to the remaining portions of the mechanism, whereupon the machine may be turned readily at the end of the row, or be transported from place to place.

Having thus described the invention, what is claimed is:—

1. A device of the class described comprising a wheel-mounted frame; suction mechanism thereon; a collection receptacle; a tubular discharge casing forming a reduced communication between the suction mechanism and the collection receptacle and insect-destroying means rotatable in a fixed plane within the discharge casing; the casing serving to direct the insects against said means, at right angles to its plane of rotation.

2. A device of the class described comprising a wheel-mounted frame; suction mechanism thereon; a collection receptacle; a tubular discharge casing forming a reduced communication between the suction mechanism and the collection receptacle; a shaft journaled for rotation in the discharge casing; and fixed radial elements upon the shaft, mounted to rotate at right angles to the axis of the casing.

3. A device of the class described comprising a frame; a longitudinally extensible axle carried by the frame; ground wheels upon the axle; a longitudinally extensible drive shaft carried by the frame; clutch mechanism carried by the frame and adapted to connect one ground wheel operatively with the drive shaft and including an extensible operating element; suction means carried by the frame; and mechanism for operatively connecting the drive shaft with the suction means.

4. A device of the class described comprising a frame; transversely separable ground wheels thereon; suction mechanism upon the frame, including an actuating shaft; a tubular discharge casing communicating with the suction mechanism; a shaft journaled in the casing longitudinally of the casing; blades upon the last mentioned shaft disposed transversely of the casing; an auxiliary shaft journaled upon the frame; means for operatively connecting the auxiliary shaft with the actuating shaft and with the blade-carrying shaft; an extensible drive shaft operatively connected with the auxiliary shaft; and means for operatively connecting the drive shaft with the ground wheels.

5. A device of the class described comprising a frame; suction mechanism thereon, including an actuating shaft; a collection receptacle; a casing forming a communication between the suction mechanism and the collection receptacle; a shaft journaled for rotation in the casing; blades upon the last mentioned shaft; fixed blades in the casing, with which the blades of said shaft coöperate; a secondary shaft journaled upon the frame; intermeshing pinions upon the secondary shaft and the blade-carrying shaft; an auxiliary shaft journaled upon the frame; intermeshing pinions operatively connecting the auxiliary shaft with the secondary shaft; a flexible element operatively connecting the auxiliary shaft with the actuating shaft; a drive shaft journaled upon the frame; intermeshing pinions connecting the drive shaft with the auxiliary shaft; a ground wheel carried by the frame; a pulley supported for rotation upon the frame; a flexible element operatively connecting the pulley with the drive shaft; and clutch mechanism for connecting the pulley with the ground wheel.

In testimony that I claim the foregoing as my own, I have hereto affixed my signature in the presence of two witnesses.

WILLIAM C. PINSON.

Witnesses:
 GUY STEPHENSON,
 R. H. WATSON.